Dec. 13, 1938.   C. BATCHELLER   2,140,197

SYNTHETIC MARBLE SHEET AND PROCESS OF FORMING SAME

Filed July 6, 1935

INVENTOR
Clements Batcheller
by
ATTORNEY

Patented Dec. 13, 1938

2,140,197

UNITED STATES PATENT OFFICE 2,140,197

SYNTHETIC MARBLE SHEET AND PROCESS OF FORMING SAME

Clements Batcheller, Glens Falls, N. Y.

Application July 6, 1935, Serial No. 30,195

15 Claims. (Cl. 18—48.8)

My invention relates to synthetic stone surfaced wall-panels, wall-tile sheets and the like, and particularly to products of this character simulating a natural marble. These products are to a very large degree made possible by utilizing, as a base or backing, the products described in my Letters Patent No. 1,995,412. Plastic sheets, formed in the manner described in this patent, are perfectly adapted for the carrying out of the processes and the forming of the new and novel products which form the basis of this application.

It has heretofore been proposed to ornament the surface of Portland cement asbestos sheets in the hard, completely hydrated state by first moisture proofing the sheets, then coating them with a white pigmented pyroxylin film to furnish a smooth bonding surface, reduce the alkalinity, etc., and thereafter transferring, to the surface so prepared by means of a decalcomania, a film carrying the desired ornamentation. Such decorative or imitative features are purely superficial in character and their use has been largely confined to interior applications. This is due to the instability of certain of the color inks used in the film printing, and the failure of the usual pyroxylin lacquer coat thereover to withstand outside exposure for any substantial length of time. Furthermore, such products are hard and brittle and have a tendency to buckle and become distorted.

Other artificial sheet products carrying simulated marble effects have been produced by modified painting methods which consist primarily in moisture-proofing the base sheet, applying a white pigmented under-coat thereto, and then applying, usually, a two coat application of color pigmented lacquer of a suitable shade to match the stone product copied. Much hand labor is involved in bringing this base color coat to a smooth surface of high gloss, and the marble graining effects are then applied to the polished surface by means of a rubber printing roll. Usually, the product is given a finishing coat of clear pyroxylin lacquer to protect the applied grain effect.

From the foregoing it will be apparent that the marble or wood graining effects thus produced are entirely superficial and moreover all such products are monotonously similar in design because of the practical limitations in providing a large variety of picture film transfers or printing rollers.

Natural marble slabs are usually finished by wet or dry "wheeling" methods, but thin, imitation, sheet products produced on the ordinary Portland cement-asbestos base will not permit this uniform polishing over the entire area due to the tendency of the sheet to curl up at the corners when subjected to moisture upon its top side. This makes "wheel" polishing of the common sheet product next to impossible.

As distinguished from the sheet products of the prior art, it will be apparent as the description proceeds that products made according to my invention in large area sheets are more or less flexible, that there is no tendency of the finished product to warp or buckle, that the grinding effects in my products extend to an appreciable degree below the surface, which is quite essential, and permits the products to be polished, either wet or dry, in the same manner as a natural marble without destroying the general effects. In other words, due to the high absorptive character of my product it is possible to impregnate the surface to an appreciable degree with any desired vein or grain pattern, and, by slight variations in the method of procedure, I am able to produce dissimilar vein effects from a single, standard pattern sheet.

While I may use a standard cement-asbestos mixture in my base or backing, the tendency of sheets of this character to warp and buckle and their relatively low absorptive properties make it extremely desirable that the base sheet employed be made in accordance with my said Letters Patent No. 1,995,412 because my product should have a very high degree of absorption for reasons which will later become apparent.

A typical formula from which I have produced my base sheets is as follows:

| | |
|---|---|
| Asbestos fibers (waste fibers)_____pounds\_\_ | 200 |
| Calcined magnesite (200 mesh)_____do\_\_\_\_ | 40 |
| Bentonite (colloidal clay, 200 mesh)\_\_do\_\_\_\_ | 12 |
| Water to plasticize_____gallons\_\_ | 20 |

In the above formula the colloidal clay or bentonite plays a very important part in obtaining the unique and advantageous qualities which characterize my invention. To a very large degree it makes possible the extremely porous base product and imparts much of the structural strength thereto as well as serving as a perfect lubricant in obtaining a workable degree of plasticity in the fiber-magnesite mixture. It also eliminates from the finished product that extreme hardness and brittleness which would otherwise be present with a binder of straight calcined magnesite.

While Portland cement is probably accountable for many of the defects in the present cement-asbestos products, I find that, within certain limits, the calcined magnesite in the base portion of my product may be replaced in part by Portland cement without detrimentally affecting the desirable physical characteristics of the base products made therefrom.

In the drawing—

In the present invention I first form, by molding or rolling, a sheet I from a plastic composition of the general character above described. To the surface of this base sheet, while plastic, I next apply a mixture 2 of marble dust, marble granules, colloidal clay of the character of bentonite, powdered calcined magnesite and white Portland cement. The mixture is preferably applied dry but may be applied as a wet plastic layer and will usually be about 1/16 of an inch in thickness although a much thicker layer may be applied if desired.

In passing, it should be noted that the products of my present invention are relatively thin as compared with the usual stone slab products and range in finished thickness from 1/8 inch to a usual maximum of 1/4 inch.

In order that there may not be too great a difference in the coefficients of expansion between the face portion and the back or base portion of my sheet which might induce separation or parting of the top layer when the product is fully hydrated, I have found it desirable to proportion my dry mixture formula as nearly as possible to that used in the base sheet. This is also desirable in that it eliminates any tendency of the finished product to warp or buckle as would be the case if a straight cement top were applied.

The folowing is a typical example of the mixed materials which best suit my purpose although it is to be understood that the proportions may be varied somewhat to vary the characteristics of the applied face. For example, if a harder surface is desired a decrease of say 10 grams in the marble dust content and an increase of 5 grams in each of the magnesite and white cement contents will effect the desired result.

|  | Grams |
|---|---|
| White marble dust (200 mesh) | 40 |
| Calcined magnesite | 30 |
| White Portland cement | 15 |
| Colloidal clay (bentonite, 200 mesh) | 5 |

Figure 1:
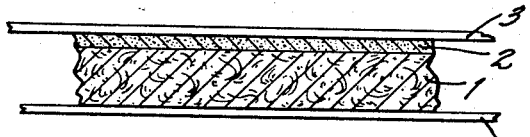
Fig. 1 is a fragmentary cross section, in which the thickness is exaggerated, of my product in the plastic condition and before pressing.
Figure 2:
Fig. 2 is a fragmentary cross section, in which the thickness is exaggerated, of the product after pressing.
Figure 3:
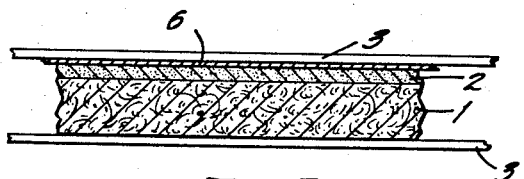
Fig. 3 is a fragmentary cross section, in which the thickness is exaggerated, of the product in plastic condition and before pressing and to the surface of which is to be imparted coloring matter to simulate the veins and shadow effects of a natural marble.

After the top layer mixture has been evenly applied to the surface of the plastic base sheet, an oiled steel plate 3 having a smooth surface, preferably polished, is placed upon the top of the composite sheet and the top layer is concreted to the plastic base, as shown at 4 and 5, respectively, in Fig. 2, by subjecting the pack to a hydraulic pressure of about 4000 pounds per square inch. Where the top mixture is applied dry, sufficient water is forced upwardly from the plastic base sheet to effect its initial hydration and also to secure adequate concretion between the two layers. Subsequent curing of the pressed product may be carried out as disclosed in my Patent No. 1,995,412. That is to say, if an incompletely hydrated product is desired, the sheet may be simply air dried for thirty-six hours at the end of which time it will acquire a substantial structural strength which will not appreciably increase with age. It will have a high power of absorption and may be impregnated with various substances, buffed or recolored, and later, by continuing the hydration in the usual moist room, brought to a high degree of surface hardness so as to display almost the same resistance to abrasion and scratching as kiln fired ceramic tile.

Natural marble slabs when highly polished always present a crystalline grain structure, and I have found it possible accurately to reproduce this effect on the surface of my finished product by adding to my dry mixture a suitable quantity of crushed, natural marble granules, say 10 grams in the formula last above given. These granules may vary in size if desired. The grinding and polishing of my product in the finished steps, brings out these larger marble particles in sharp relief with the surrounding sheet areas, thereby greatly adding to the natural appearance of the product.

I have also found that a very attractive surface having a semi-polished satin effect can be produced upon my products by passing them under a mechanical drum sander and subsequently roller buffing them either wet or dry. These effects are due in a very large degree to the presence of the colloidal clay in the product.

Marble surface sheets according to my invention will be found to have about the same degree of hardness as genuine Vermont white marble which, however, is relatively, not a hard stone product.

Many of the finer white marbles in a less pure state than is represented by the clear white product, contain irregular streaks or veins throughout their surface and also high and low shadow effects due to the presence of carbonaceous matter or oxides of metals. These dark areas stand out in beautiful relief when the product is highly polished.

I have found, due to the very highly absorptive nature of the face of my product while either plastic or substantially hydrated, and which is largely accounted for by the presence of the colloidal clay in the sheet surface and to some extent by the porosity of the marble dust present, that it is possible to reproduce these vein effects not only upon the surface of the sheet but well below the surface. This is quite important because it is not possible to do this upon a straight Portland cement-asbestos product of the old order because of its low absorptive nature.

Figure 4:
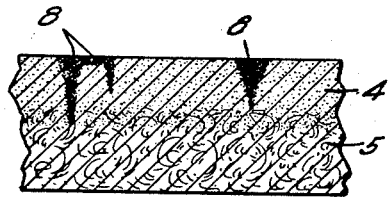
Fig. 4 is a fragmentary cross section of my product, drawn to an enlarged scale, and showing the manner in which the coloring matter penetrates the surface layer.
Figure 5:
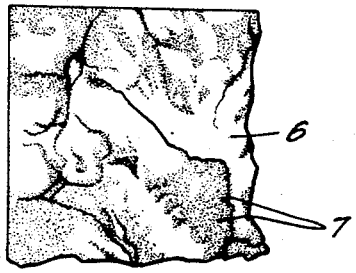
Fig. 5 is a fragmentary plan view of a decalcomania used in coloring the product.

By a special modification of the lithographing art, I have found that it is possible to produce in my products a printed facsimile of the vein and shadow effects found in a natural slab of marble. Paper sheets 6 having printed thereon reproductions or facsimiles 7 of the natural marble veins and shadow spots with suitable color dyes, such as nigrosine black, carbanthrene black, or other stable inorganic or organic dye materials of appropriate color, and which are soluble, furnish suitable media for imparting the vein and shadow effects to my products. By placing one of these specially printed paper sheets face down upon the dry or plastic top mixture 2 before it is concreted to the base, and then subjecting the pack to pressure as above set forth, the complete vein effect is taken up by the product and deeply absorbed, as shown at 8 in Fig. 4, in true outline with the paper pattern used. Similarly there is a considerable absorption by the product, but less deep, of the other more lightly printed areas on the sheet pattern.

While it is true that the removal of the paper pattern after pressing discloses an unsightly blurred pattern on the surface of the product, subsequent polishing or light sanding of the surface removes these defects and discloses a perfectly absorbed vein pattern and to a lesser degree the high and low shadow effects.

Using only a single standard pattern sheet I find that it is possible to produce products having dissimilar vein effects. Thus, by varying the water content of the base plastic and by varying the rate at which the pressure is applied to the pack, the extent to which the impression is absorbed can be varied, or the transfer can be actually thrown out of true impression. The faster the water is eliminated from the plastic sheet by pressing, the greater will be the lateral movement of the plastic in its thickness reduction. Therefore, by varying the water content of my plastic and varying the rate at which the pressure is applied it is possible to create a distortion of the printed sheet pattern and thus vary the appearance of the product. Similarly, the more water that is brought into contact with the printed vein sheet in contact with the product the greater will be the dispersion of the soluble ink over the surface of the product. The unequal absorption of this dispersed ink produces high and low shadow effects in the sheet area which are developed by the polishing and sanding operations, and which supplement the fine markings and permit the creation of a veined and shaded product conforming very closely to natural marble.

By eliminating the marble granules from my formula and substituting an appropriate color pigment or pigments it is possible to produce a wall-tile sheet having a more enduring colored surface than the customary pigmented lacquer finish which is easily marred and scratched due to the relative softness of the surface film.

From the foregoing, it will be apparent that the vein and shadow effects in my product extend an appreciable distance into the body thereof as distinguished from the purely surface painted or printed effects of the prior art.

Since my finished product, depending upon the curing treatment to which it is subjected, may contain either partially or completely hydrated calcined magnesite, or both, the term "magnesium hydrate", as used in the claims, is to be understood as including magnesium in either one or both of these forms.

It is also to be understood that the term "marble" includes all marbles irrespective of their color.

What I claim is:

1. A synthetic marble sheet comprising a base or back portion formed of a composition containing asbestos fibres with a binder of magnesium hydrate and bentonite; and a face portion concreted to said base to form an integral unit and comprising marble dust, magnesium hydrate and bentonite.

2. A synthetic marble sheet comprising a base or back portion formed of a composition containing asbestos fibres with a binder of magnesium hydrate and bentonite and a face portion concreted to said base to form an integral unit and comprising marble dust and granules, magnesium hydrate and bentonite.

3. A synthetic marble sheet comprising a base or back portion formed of a composition containing asbestos fibres with a binder of magnesium hydrate and bentonite and a face portion concreted to said base to form an integral unit and comprising marble dust with a binder of magnesium hydrate and minor quantities of Portland cement and bentonite.

4. A synthetic marble sheet comprising a base or back portion formed of a composition containing asbestos fibres with a binder of magnesium hydrate and bentonite and a face portion concreted to said base to form an integral unit and comprising marble dust and granules, magnesium hydrate and minor quantities of Portland cement and bentonite.

5. An artificial stone product having a face simulating natural marble in appearance and hardness and comprising marble dust, and a binder comprising principally magnesium hydrate with minor quantities of Portland cement and bentonite.

6. An artificial stone product having a face simulating natural marble in appearance and hardness and comprising marble dust, marble granules and a binder comprising principally magnesium hydrate with minor quantities of Portland cement and bentonite.

7. An artificial stone product having a face simulating a natural marble in appearance and hardness and comprising marble dust, marble granules and magnesium hydrate with minor quantities of Portland cement and bentonite; the surface of said product being impregnated to an appreciable depth with coloring matter to simulate the veins and shadow effects of a natural marble.

8. A synthetic stone sheet comprising a base or back portion formed of a composition containing, by weight, a major portion of asbestos fibres, minor portions of bentonite and Portland cement, and an intermediate portion of magnesium hydrate; and a face or front portion concreted to said base portion to form an integral unit and formed of a composition containing, by weight, major portions of marble dust and magnesium hydrate, and minor portions of Portland cement and bentonite.

9. A synthetic stone sheet comprising a base or back portion formed of a composition containing, by weight, a major portion of asbestos fibres, a minor portion of bentonite, and an intermediate portion of magnesium hydrate; and a face or front portion concreted to said base portion to form an integral unit and formed of a composition containing, by weight, major portions of marble dust and magnesium hydrate, and minor portions of marble granules, Portland cement and bentonite.

10. Those steps in the method of making a sheet product having a face simulating a natural stone which comprise forming a backing from a plastic mixture containing asbestos fibres and calcined magnesite with a minor quantity of bentonite, covering said backing while plastic with a layer of a dry mixture containing comminuted marble, calcined magnesite, white Portland cement and a minor quantity of bentonite, placing face down upon said dry layer a pattern of said stone printed in soluble colors; and subjecting the whole to substantial pressure to effect a concretion of dry mixture with said backing and an absorption of said printed pattern to a substantial depth by said product.

11. The process set forth in claim 10 together with the additional steps of curing said product and polishing the face thereof.

12. Those steps in the method of making a sheet product having a face simulating a natural veined stone which comprise forming from a water plastic material a suitable backing for said product, covering said backing while plastic with a comparatively thin layer of a dry mixture containing comminuted marble, calcined magnesite, white Portland cement and a small quantity of bentonite, placing face down upon said layer a pattern of the veins in the stone to be simulated printed in soluble colors, subjecting the whole to pressure sufficient to force liquid from said plastic backing through said dry mixture into contact with said soluble colors to effect a concretion of said mixture with said backing, curing the product, and thereafter subjecting the face to a finishing treatment.

13. A synthetic marble sheet comprising a base or back portion formed of asbestos fibres and cement, and a face portion concreted to said base portion to form a unitary structure and containing particles of marble, magnesium hydrate, Portland cement and bentonite.

14. Those steps in the making of a sheet product having a face simulating a natural stone which comprise forming a backing from a plastic mixture containing hydraulic cement, covering said backing while plastic with a layer of a dry mixture containing fine particles of the stone to be simulated, calcined magnesite and a minor quantity of bentonite, placing face down on said dry layer a pattern of said stone printed in soluble colors; and then subjecting the whole to substantial pressure to effect a concretion of the dry mixture with said plastic backing and an absorption of said printed pattern to a substantial depth by said product.

15. The process set forth in claim 14 together with the additional steps of curing said product and polishing the face thereof.

CLEMENTS BATCHELLER.

CERTIFICATE OF CORRECTION.

Patent No. 2,140,197. December 13, 1938.

CLEMENTS BATCHELLER.

It is hereby certified that error appears in the printed specification of the above numbered patent requiring correction as follows: Page 1, second column, line 13, for the word "grinding" read graining; page 2, first column, line 55, for "folowing" read following; page 4, first column, line 25, claim 12, after "colors" insert and; and that the said Letters Patent should be read with this correction therein that the same may conform to the record of the case in the Patent Office.

Signed and sealed this 16th day of May, A. D. 1939.

Henry Van Arsdale (Seal) Acting Commissioner of Patents.